May 8, 1928.
L. C. MILBURN
WING LEVELING DEVICE
Filed June 9, 1926
1,669,380
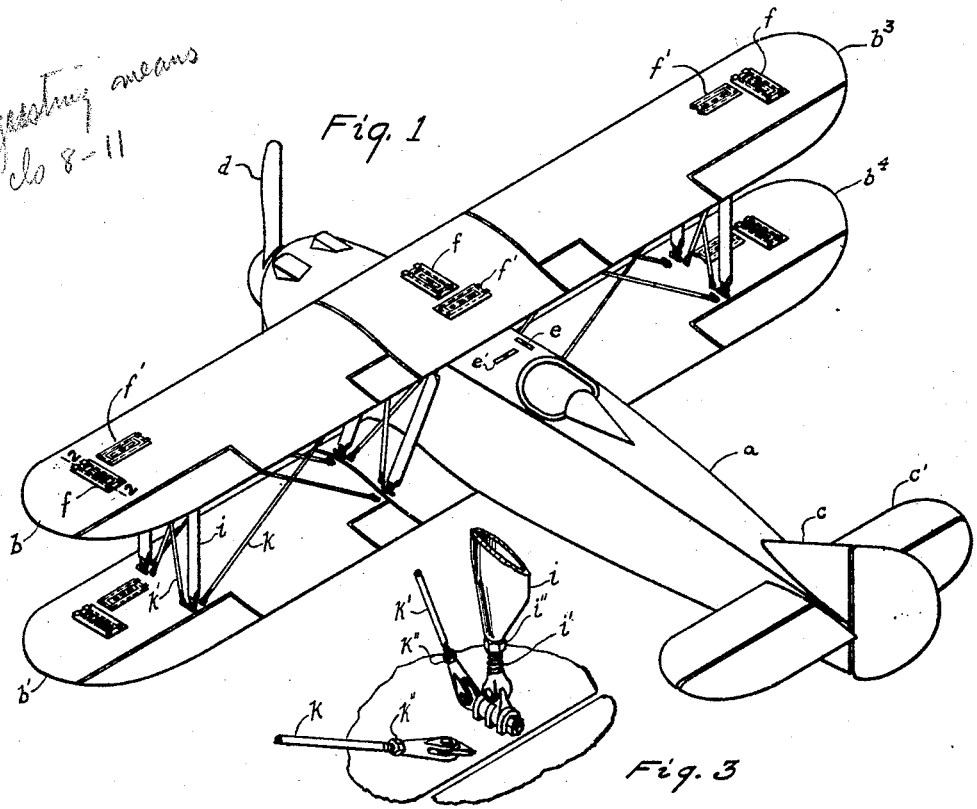
Fig. 1
Fig. 3
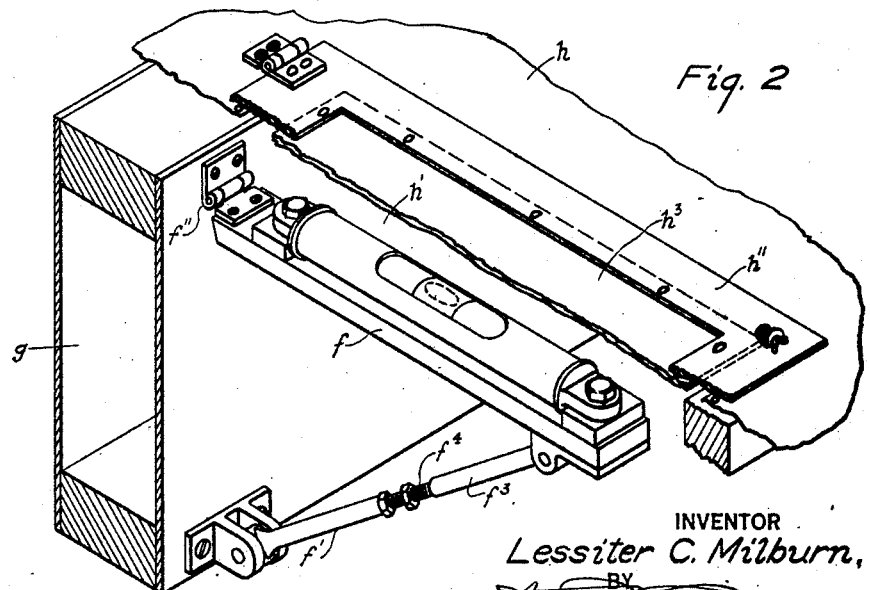
Fig. 2
INVENTOR
Lessiter C. Milburn,
BY
ATTORNEY.

Patented May 8, 1928.

1,669,380

UNITED STATES PATENT OFFICE.

LESSITER C. MILBURN, OF CLEVELAND, OHIO.

WING-LEVELING DEVICE.

Application filed June 9, 1926. Serial No. 114,748.

My invention relates to improvements in wing leveling devices, and has for its object the provision of means for indicating and thereby permitting the proper setting of the wings of air-planes in correct relation to one another and to the various axes of the plane. Preferably such leveling means are built into the structure of the wings in such manner as to render them conveniently accessible and readily visible.

Those acquainted with the art are apprised of the numerous and tedious measurements necessary to place the various wing panels correctly, as well as subsequently to check up and adjust the alinement from time to time. Accordingly, it has been my purpose to equip the various components of an airplane so that these extended and tedious measurements and adjustments may be done away with through the adoption of measures and means hereinafter defined.

I may best exemplify and explain my improvement in connection with the accompanying drawings disclosing an airplane fully equipped in accordance with my invention, wherein:

Figure 1 is a view in isometric elevation, somewhat diagrammatic in character, illustrating an airplane provided with my improvement;

Fig. 2 is an enlarged fragmentary sectional view on line 2—2, Fig. 1, and

Fig. 3 is a fragmentary isometric view, also upon larger scale, illustrating the adjusting means for the tie-rods and struts duplicated throughout the structure.

Throughout the several figures of the drawing, I have employed the same character of reference to indicate similar parts.

A typical fuselage $a$ is shown in Fig. 1 having the wing panels $b$, $b'$, $b^3$ and $b^4$ of a biplane. The rectangularly disposed tail surfaces $c$ and $c'$ are shown in association with the wings opposite the forwardly positioned propeller $d$.

Adjacent to the aviator's cockpit, two spirit levels $e$, $e'$ are accurately mounted at right angles to each other, these being of the spirit or fluid type similar to the one shown in Fig. 2. Said levels, accordingly, furnish a definite datum plane when the fuselage is properly positioned, from which the setting of the wings may be determined.

Each of the wing panels, in turn, is equipped with a pair of these levels, $f$, $f'$, preferably built into the wing structure and adjustably mounted with respect thereto. Thus, referring to Fig. 2, the level $f$ is of the well known fluid type supported directly at one end by the hinge $f''$ and adjacent to the other end by a rod $f^3$ and intermediate turnbuckle $f^4$ from the lower bracket $f^5$. The wing beam $g$ from which the level is supported, is provided with the usual fabric covering $h$, wherein an opening $h'$ is provided immediately above the level. A frame $h''$ mounts the transparent window $h^3$, through which the level may readily be seen at all times, while normally closing the opening through which access may be had for adjusting the level when necessary.

The wing panels are provided with the usual struts $i$ and tie-rods $k$, $k'$, duplicated throughout the plane. The adjusting means therefor are well shown in the fragmentary view, Fig. 3, wherein the strut $i$ is adjustably mounted upon the threaded terminal $i'$ and retained in its adjusted position by means of the lock nut $i''$. Similarly, the tie-rods $k$ and $k'$ have screw adjusting means at their terminals which normally are locked by the nuts $k''$.

It will be understood that merely by loosening and tightening these adjustable struts and tie-rods, the spacing and relative adjustment of the wing panels may be individually effected with relation to the datum plane afforded by the fuselage itself. Thus, the levels $f$ and $f'$ of each wing panel are consulted in turn, and their readings are made to correspond with the readings of $e$ and $e'$ by adjusting the struts and tie-rods when found necessary, so that the airplane may readily be tested and placed in proper adjustment of its parts for flight.

Although access is provided to the interiorly positioned levels within the composite wing structures by means of the hinged frames closing the respective openings, it is rarely necessary to give attention to these visibly positioned levels once the plane has been suitably conditioned for flight. Nevertheless, such leveling means afford the readiest opportunity for ascertaining the correctness of the respective adjustments of the wing sections whenever required.

Having now described the preferred embodiment of my invention or improvement,

I claim as new, and desire to secure by Letters Patent, together with such modifications as may be made by one ordinarily skilled in the art, the following:

1. In an airplane, the combination with its wing panel, of means permanently associated therewith for indicating the level thereof, and additional means for adjusting the same with respect to said panel, substantially as set forth.

2. In an airplane, the combination with the fuselage and its supporting wing panels, of angle gauges built into said wing panels for indicating the angles thereof individually, and adjusting means provided for said gauges, substantially as set forth.

3. In an airplane, the combination with a composite wing panel, comprising a frame and enclosing covering therefor, of level-indicating means provided interiorly of said covering adjacent to an opening therein, and a transparent cover for said opening, substantially as set forth.

4. In an airplane, the combination with a composite wing panel, comprising a frame and enclosing covering therefor, of level-indicating means attached to said frame interiorly of the covering adjacent to an opening therein, and means for adjusting said level-indicating means, substantially as set forth.

5. In an airplane, the combination with a composite wing panel, comprising a frame and outer covering therefor, of level-indicating means associated therewith interiorly of the covering adjacent to an opening therein, means for adjusting said level-indicating means, and a transparent closure for said opening, substantially as set forth.

6. In an airplane, the combination with a composite wing panel, comprising a frame and outer covering therefor, of angle gauges associated therewith interiorly of the covering and approximately at right angles to each other, and means permitting the reading of said gauges from outside said panel, substantially as set forth.

7. In an airplane, the combination with a composite wing panel, comprising a frame and enclosing covering therefor, of level-indicating means associated therewith interiorly of the covering adjacent to an opening therein, adjusting means for said level-indicating means, and a transparent closure for said opening, substantially as set forth.

8. In an airplane, the combination with the fuselage and its supporting wing panels, means for adjusting the wing panels, and level-indicating appliances associated with the wing panels, of means for relatively adjusting the level-indicating means with respect to their associated wing panels, substantially as set forth.

9. In an airplane, the combination with the fuselage and its supporting composite wing panels, of means for independently adjusting said panels, level-indicating appliances visibly positioned interiorly of the wing panels, and means for adjusting said appliances with respect to their associated wing panels, substantially as set forth.

10. In an airplane, the combination with the fuselage and its supporting wing panels, of means for independently adjusting said panels, level-indicating appliances visibly positioned and associated with said fuselage and wing panels, and means for adjusting said wing panels with respect to the fuselage, substantially as set forth.

11. In an airplane, the combination with the fuselage and its supporting wing panels, of means associated with the former for indicating a datum plane, level-indicating appliances associated with the wing panels, and means for effecting the independent adjustment of the wing panels with respect to the fuselage, substantially as set forth.

12. In an airplane, the combination with the fuselage and its supporting composite wing panels, of level-indicating appliances associated and visibly positioned with respect to the fuselage and its wing panels, and means for independently effecting the adjustment of the wing panels with respect to the fuselage and to one another, substantially as set forth.

13. In an airplane, a fuselage, a wing panel adjustably mounted with respect thereto, an angle gauge built into said fuselage, and a second angle gauge built into said panel, whereby a ready means is provided for adjustably maintaining the proper relation between said fuselage and panel.

In testimony whereof I do now affix my signature.

LESSITER C. MILBURN.